United States Patent [19]

Sugiura et al.

[11] Patent Number: 4,820,951
[45] Date of Patent: Apr. 11, 1989

[54] MULTIPHASE SMALL SIZE BRUSHLESS DC MOTOR

[75] Inventors: Tsuneo Sugiura; Tomio Nakata, both of Iida, Japan

[73] Assignee: Tamagawa Seiki Kabushiki Kaisha, Tokyo, Japan

[21] Appl. No.: 116,519

[22] Filed: Nov. 3, 1987

[30] Foreign Application Priority Data

Nov. 13, 1986 [JP] Japan .................. 61-268604

[51] Int. Cl.⁴ .................. H02K 37/14; H02K 3/34
[52] U.S. Cl. .................. 310/257; 310/45; 310/194
[58] Field of Search .................. 310/49 R, 162, 257, 310/42, 45, 194, 208

[56] References Cited

U.S. PATENT DOCUMENTS

| | | | |
|---|---|---|---|
| 2,839,697 | 6/1958 | Pierce et al. | 310/257 |
| 4,361,465 | 4/1983 | Renkl et al. | 310/49 R |
| 4,422,113 | 12/1983 | Mabon | 310/49 R |
| 4,714,850 | 12/1987 | Akiba et al. | 310/49 R |
| 4,714,853 | 12/1987 | Palmero et al. | 310/257 |

Primary Examiner—Patrick R. Salce
Assistant Examiner—D. L. Rebsch
Attorney, Agent, or Firm—Brooks Haidt Haffner & Delahunty

[57] ABSTRACT

A brushless direct current electric motor includes a casing, a stator and a plurality of driving coils disposed within the casing, and a rotor having a plurality of alternating north and south magnetic poles formed on its periphery, with the rotor being disposed for rotation within the casing. The stator is composed of plural stator elements, with driving coils wound separately on respective insulated stator elements.

2 Claims, 3 Drawing Sheets

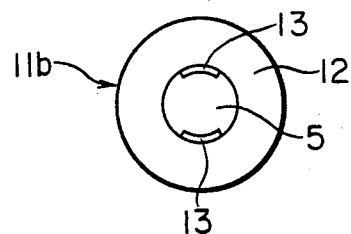
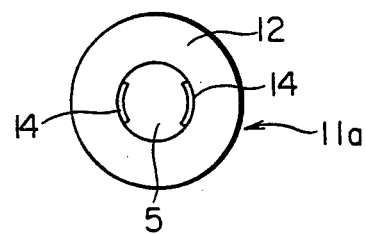
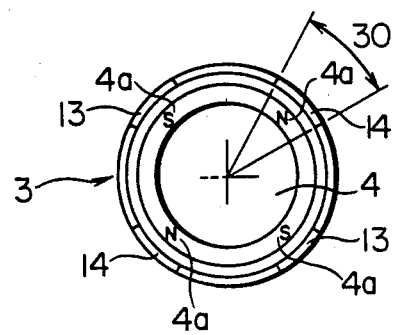
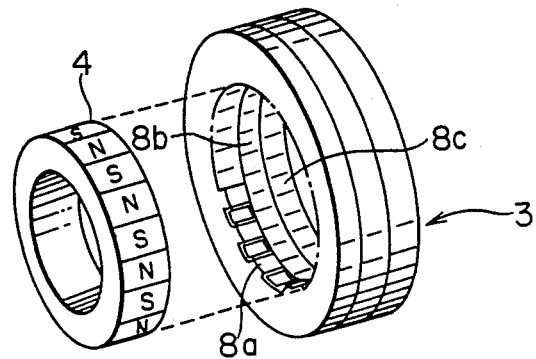

MULTIPHASE SMALL SIZE BRUSHLESS DC MOTOR

BACKGROUND OF THE INVENTION

1. Field of the Invention

This invention relates to a brushless direct current electric motor. More particularly, it relates to an improvement in a winding structure in an ultra small size direct current motor of a longer length or in a reduced thickness large diameter motor.

2. Prior Art

A number of various constructions have been suggested and adopted for kind of the brushless direct current electric motor; typical of these is a construction shown in FIGS. 1 and 2, although it is not shown herein in what reference material or literature it is introduced.

Referring to FIGS. 1 and 2, the numeral 1 denotes a casing which is substantially cylindrical in its entirety and provided at the axial end parts thereof with a pair of bearings 2, 2 a substantially cylindrical stator 3 formed by a large number of laminated stator core pieces 3a as shown in FIG. 2 is disposed in contact with the inner wall 1a of the casing 1.

A rotor 4 as later described is disposed for rotation within a central axial bore 5 of the stator 3, plural magnetic poles 6 are formed radially for defining the peripheral wall of the bore 5, and a driving coil holding recess 7 is defined between adjacent ones of these magnetic poles 6, 6.

A driving coil 8 is disposed within these driving coil holding recesses 7. The driving coil 8 may be wound by an automatic winding machine (not shown), or the coil may be previously wound and subsequently inserted into the coil holding recesses 7.

A rotary shaft 9 formed integrally with the rotor 4 is disposed for rotation within the bearings 2, 2, with the driving electric current flowing from an electrical source, not shown, through an electronic switching means, not shown, and through the driving coil 8.

The brushless direct current electric motor of the prior art described above, has had the following disadvantages.

(i) In the case of the ultra small size direct current electric motor with a longer length, the stator diameter is not larger than about 20 mm, so that the central axial bore formed in the stator for accommodating the rotor and the space available for forming the drive coil holding sections are extremely small, such that extreme difficulties are encountered in the operation of performing the winding by an automatic winding machine or in inserting the wound drive coil, with the result that production efficiency is considerably lowered.

(ii) In case of a longer stator length, such as more than about 30 mm, extreme difficulties are encountered in the operation of inserting the driving coil, such that it becomes virtually impossible to obtain a motor of a size less than a predetermined small size of the ultra-small direct current electric motor.

(iii) On the other hand, the stator of an electric motor of a reduced thickness and a large diameter, such as the direct drive electric motor, is larger in diameter and hence of the multi-pole multi-slot type structure. With the increase in the number of slots, however, the number of the coils is also increased, with consequent increase in working time.

In view of the above described disadvantages of the prior art motor, it is a principal object of the present invention to provide a direct current electric motor of an ultra small size and a longer length and an electric motor of a large size and reduced thickness, wherein the stator is formed of a plurality of stator elements to permit an extremely facilitated coil winding operation.

According to the present invention, there is provided a brushless direct current electric motor comprising a casing, a stator and driving coils disposed within said casing, and a rotor having a plurality of alternating north and south magnetic poles formed on the outer periphery of the rotor, said rotor being disposed within said casing, wherein the stator is composed of a plurality of stator elements, and driving coils are wound separately on the respective ones of the stator coil elements.

In the brushless direct current electric motor of he present invention, since the stator is composed of a plurality of stator elements, the driving coils can be applied separately to the respective stator elements, these stator elements, thus wound with the driving coils, being then inserted into the casing. In such a manner, it becomes readily possible to produce the stator with the driving coil applied thereto even in the case of a direct current electric motor of a longer length and a reduced diameter, for a multi-pole stator, it is only necessary to increase the number of magnetic poles formed on the stator elements, it being unnecessary to increase the number of the coils with the increase in the number of magnetic poles. In such a manner, it becomes readily possible to produce a multiple pole large stator type electric motor.

Also, by reason of the above described stator structure, it becomes readily possible to produce a direct current electric motor of a longer length and an ultra-small overall size which it was impossible to produce in the prior-art practice.

In short, the brushless direct current electric motor of the present invention has the following advantages.

Since the stator is formed by a plurality of stator elements that can be wound separately with driving coils, the operation of winding the coil about the stator may be facilitated, such that the driving coil can be applied easily, even in cases wherein the stator is reduced in diameter and increased in axial length.

Also, even in these cases, the stator may be produced as desired, subject to selection of the number of the stator elements, such that the difficulties in production of an electric motor having a small diameter and a longer length may be substantially eliminated. Also, since each stator element may be assembled by connecting a pair of stator pieces to each other, the axial length of each stator element can be changed freely to produce the stator of a direct length conforming to the axial length of the rotor. In the direct drive electric motors, such as multi-pole motors with a reduced thickness and a larger diameter, there is no necessity of increasing the number of coils with the increase in the number of magnetic poles so that the work load is not increased, and hence the manufacture of the stator is also facilitated.

BRIEF DESCRIPTION OF THE DRAWINGS

FIGS. 3 to 8 illustrate a brushless direct current electric motor according to the present invention, wherein FIG. 3 is a longitudinal sectional view showing a brushless direct current electric motor according to a preferred embodiment of the present invention.

FIG. 4 is a diagrammatic perspective view showing essential portions of a stator shown in FIG. 1.

FIGS. 5 and 6 are side views showing stator pieces of the stator shown in FIG. 4.

FIG. 7 is an end view of a casing accommodating both the stator and the rotor for illustrating the relative angular disposition of the stator and the rotor.

FIG. 8 is a perspective view showing a modified embodiment of a brushless direct current electric motor according to a modification.

DESCRIPTION OF THE INVENTION

Figure 1:
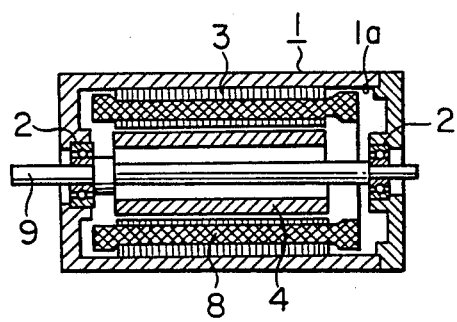
FIGS. 1 and 2 are a diagrammatic longitudinal sectional view and a partial perspective view, respectively, showing the prior-art brushless direct current electric motor.

Referring to the drawings, a preferred illustrative embodiment of the brushless direct current electric motor according to the present invention will be explained in detail.

Figure 2:
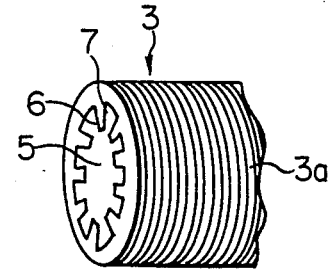

The parts or components same as or equivalent to those of the prior art device shown in FIGS. 1 and 2 are depicted by the same reference numerals for simplicity.

Referring to FIGS. 3 to 8, the numeral 1 denotes a generally cylindrical casing provided at both axial ends thereof with a pair of bearings 2, 2. A stator 3 formed by a plurality of independent stator elements 10a, 10b and 10c are disposed, on the inner wall of the casing 1, and within a central axial bore 5 of the stator 3, there is rotatably disposed a rotor 4 having a plurality of alternate N and S magnetic poles on the outer peripheral surface thereof.

The rotor 4 is integrally provided with a rotary shaft 9 disposed for rotation within the bearings 2, 2. In FIG. 7, the numeral 4a denotes the magnetized portions serving as the aforementioned magnetic poles.

Figure 3:
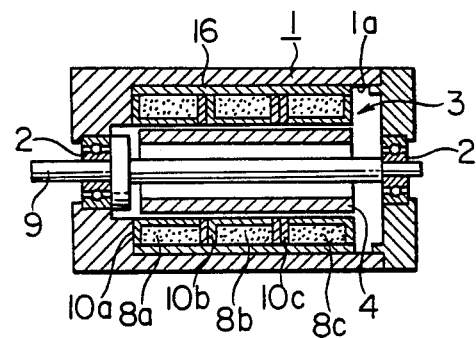
Figure 4:
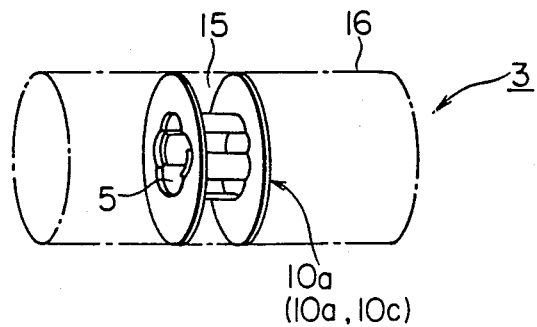

The construction of the stator 3 is shown more in detail in FIGS. 3 to 5. As shown therein, the stator 3 is formed by three stator elements 10a to 10c.

Each of the stator elements 10a to 10c is formed by a pair of stator pieces 11a and 11b formed of a magnetic material, with each of these stator pieces 11a and 11b being formed in turn by a circular or annular flange 12 and a pair of axially extending yoke pieces 13 and 14.

These yoke pieces 13, 14 are formed at angularly offset positions, such that, when the stator pieces 11a and 11b are joined together as shown in FIG. 4 in a facing relation to each other, the yoke pieces 11a and 11b are accommodated within the axial bores 5 of the oppositely disposed stator elements 10b and 10a, respectively, as shown in FIG. 7, with the yoke pieces 11a and 11b being disposed in angular registration with the four magnetic poles 4a formed on the outer periphery of the rotor 4.

A driving coil 8 is disposed in an annular recess 15 defined between the flanges of the stator pieces 11a and 11b. More in detail, driving coils 8a, 8b and 8c for U, V and W phases, respectively, are wound in the annular recesses 15 of the stator elements 10a, 10b and 10c, respectively.

These stator elements 10a to 10c are generally cylindrical in configuration, as shown in FIGS. 3 and 4, being spool-like, and are disposed in a stator element holder formed of a magnetic material.

The stator elements 10a to 10c are disposed in the holder 16 in an axially juxtaposed relationship with the stator 3 being made up of the stator elements 10a to 10c and the holder 16.

Each of the stator elements 10a to 10c is provided with an insulating layer, formed of, for example, molded resin, not shown, for integrally connecting the respective stator pieces 11a and 11b to each other, this insulating layer providing not only for integral connection of the stator pieces 11a and 11b to each other, but also for electrical insulation between the driving coils 8a to 8c and the stator pieces 11a and 11b. It is noted that the insulating layer is not formed on the outer periphery of the flanges 12 of each of the stator elements 10a to 10c, such that an electrical conducting path is established between these flanges 12 and the stator element holder 16.

The brushless direct current electric motor of the present invention, so far shown and described, operates in such a manner that, as the driving pulses from a driving pulse generating circuit, not shown, are applied to the respective driving coils 8a to 8c, through electronic switching means, not shown, the magnetic operation is induced in accordance with the driving of the U, V and W phases, for driving the rotor 4 into revolutions at a predetermined constant speed.

Figure 9:
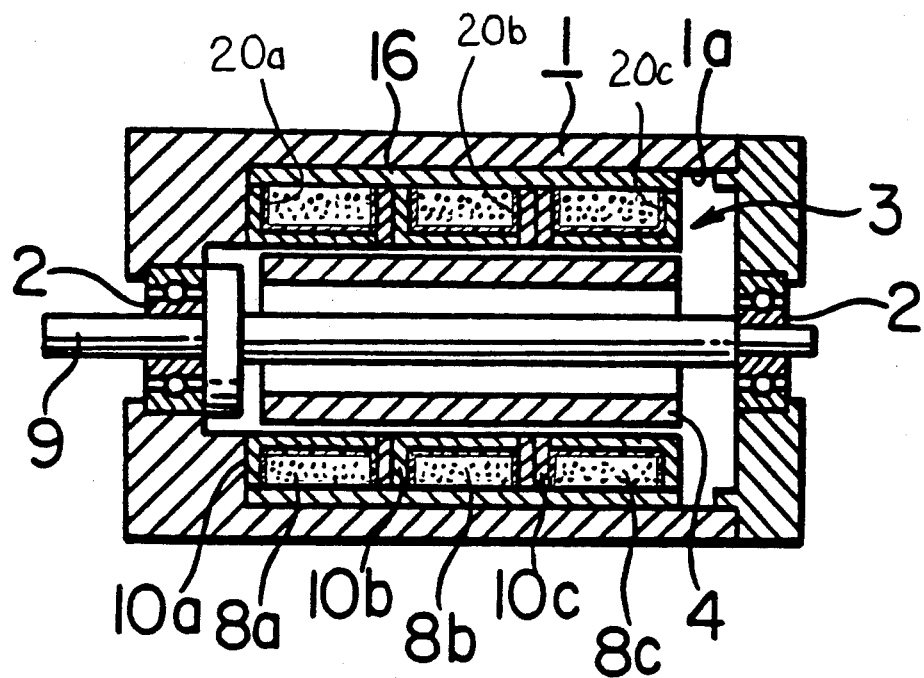

It is to be noted that the construction of the stator 3 according to the above described embodiment is for illustration only and any other construction in which the stator 3 is divided into a plurality of axially juxtaposed stator elements in the form of blocks should naturally be included within the scope of the present invention. FIG. 8 shows a modified embodiment of the present invention as applied to a direct driving electric motor of reduced thickness and large diameter. FIG. 9 particularly shows coating 20a, b, c of stator elements 10. Since it is intended in the present modified embodiment to provide a thin type motor with an enlarged diameter, the thickness of each of the stator elements is reduced, while more than four magnetic poles are formed on the outer periphery of the rotor 4. In other respects, the present modification is similar to the preceding embodiment.

While the present invention has been described with reference to the preferred embodiments, it should be understood that various other modifications may be contemplated within the scope of the present invention.

What is claimed is:

1. A multi-phase small size brushless DC motor comprising in combination: a casing having a pair of end bearings in which is mounted a rotor axis supporting a rotor with a plurality of circumferentially disposed alternating magnetic poles, at least three independent stator elements each formed from a pair of mating complementary stator pieces of magnetic material, said stator pieces each having a ring shaped radial flange portion from the radially inner periphery of which yoke pieces with radially outer faces extend axially toward the radial flange portion of the other stator piece of the respective pair of stator pieces, the yoke pieces from each stator piece of a respective pair of stator pieces being interdigitated with the yoke pieces from the other stator piece of the pair to form a spool-like structure, an insulating layer formed on the surface of said stator pieces, except for the outer periphery of said flange portions, for integral connection of the stator pieces of each pair of stator pieces and for insulating said stator pieces from respective drive coils, each of said spool-like structures having a corresponding drive coil disposed thereon wound directly about the insulated radially outer faces of said respective yoke pieces, a cylindrical magnetic sleeve holder for said spool-like structures mounted in said casing and having a radially inner cylindrical face, said plurality of independent spool-like structures with said drive coils thereon being mounted within said cylindrical holder with the outer peripheries of said stator piece flanges in electrical contact with said radially inner face of said cylindrical holder, and with said yoke pieces in angular correspondence with said plurality of rotor magnetic poles.

2. A multi-phase small size brushless DC motor according to claim 1, wherein said insulating layer is composed of molded resin.

* * * * *

UNITED STATES PATENT AND TRADEMARK OFFICE
CERTIFICATE OF CORRECTION

PATENT NO. : 4,820,951

DATED : April 11, 1989

INVENTOR(S) : T. Sugiura et al

It is certified that error appears in the above-identified patent and that said Letters Patent is hereby corrected as shown below:

Column 1, line 14, "kind of the" should read --this kind of--; line 26, change "plural" to read --plurality of--; line 28, after "5" delete comma ","; line 65, after "increased" delete comma ",".
Column 2, line 15, "he" should read --the--; line 43, after "easily" delete comma ","; line 46, after "desired" delete comma "," and delete "the" (second occurrence); line 58, after "increased" delete comma ",".
Column 3, between lines 12 and 13, insert --Fig. 9 is an enlargement of Fig. 3 showing the insulating layer on the stator elements.--; line 26, after "disposed" delete comma ","; line 68, after "layer" and before the comma (,), insert --20a to 20c, respectively--.
Column 4, line 1 after "resin" delete comma ","; line 4, after "other" delete comma ","; lines 29-31, delete "Fig. 9 particularly shows coating 20a, b, c of stator elements 10."

Signed and Sealed this

Twenty-seventh Day of February, 1990

Attest:

JEFFREY M. SAMUELS

*Attesting Officer*       *Acting Commissioner of Patents and Trademarks*